United States Patent [19]
Palmer

[11] Patent Number: 5,620,664
[45] Date of Patent: Apr. 15, 1997

[54] PERSONAL OXYGEN DISPENSER

[76] Inventor: Kenneth J. Palmer, Stand-By Systems, Inc. 10210 N. Central Expressway Suite 212 LB 33, Dallas, Tex. 75231

[21] Appl. No.: 526,155

[22] Filed: Sep. 11, 1995

[51] Int. Cl.⁶ .................................................. A62B 7/08
[52] U.S. Cl. ........................ 422/122; 422/120; 422/126
[58] Field of Search ................................ 422/120, 126, 422/122, 305, 164–167; 48/61, 118.5; 55/DIG. 33

[56] References Cited

U.S. PATENT DOCUMENTS

| | | |
|---|---|---|
| 3,733,008 | 5/1973 | Churchill et al. . |
| 3,736,104 | 5/1973 | Churchill et al. . |
| 3,756,785 | 9/1973 | Netteland ............................ 422/126 X |
| 3,767,366 | 10/1973 | Staub, Jr. ............................ 422/126 X |
| 3,868,225 | 2/1975 | Tidd .................................... 422/126 X |
| 3,955,931 | 5/1976 | Thompson ............................. 422/165 |
| 3,986,838 | 10/1976 | Reichert ................................. 422/126 |
| 4,342,752 | 8/1982 | Collins ................................... 422/126 |

*Primary Examiner*—Robert J. Warden
*Assistant Examiner*—Krisanne M. Thornton
*Attorney, Agent, or Firm*—W. Thomas Timmons; Timmons & Kelly

[57] ABSTRACT

A lightweight, personal, portable dispenser of medically pure oxygen at appropriate temperature and delivery rate for direct inhalation is disclosed. The dispenser contains an oxygen producing generator to initiate the creation of oxygen instantaneously from a fuel-less self-contained chemical reaction of extended shelf-life inert compounds in a totally safe and reliable generator. The oxygen initially enters an expansion chamber. A cylindrical dispenser body houses the oxygen producing generator and forms an annular space between the cylindrical dispensing body and the oxygen producing generator. A bottom web attached to the periphery of the bottom of the cylindrical dispenser body allows air from outside of the dispenser to enter the annular space formed between the cylindrical dispensing body and the oxygen producing generator and flow out the top of the cylindrical dispenser body. The oxygen passes through a cooling coil and the air flowing through the annular space cools the cooling coil and any oxygen flowing through it. In one arrangement, the cooling coil is formed within the annular space between the cylindrical dispensing body and the oxygen producing generator and forms a cylindrical helix.

5 Claims, 7 Drawing Sheets

PERSONAL OXYGEN DISPENSER

BACKGROUND OF THE INVENTION

1. Field of the Invention

This invention relates to a light weight portable dispenser containing a chemical generator which provides medically pure oxygen at a controlled delivery rate for direct human inhalation. Specifically, this invention utilizes the creation of oxygen from completely inert compounds with extended shelf life in a contained chemical reaction which can be instantly activated in this totally safe and reliable personal dispenser.

2. Description of Related Art

In order to completely understand and appreciate this invention in its unique context, reference will be made to a number of prior art patents and publications contained therein, in the following text.

Chemical oxygen generators, formed of an alkali metal chlorate and one or more sodium or potassium oxides, cited as related art in U.S. Pat. No. 3,702,305 (Thompson) have been known for some time. Those cited in the above Patent include: U.S. Pat. Nos. 2,469,414; 2,558,756; 2,775,511; 3,207,695; 3,276,846 and 3,233,187. All require a separate substance such as iron, charcoal, magnesium or manganese to maintain combustion, which is the "oxygen creating" reaction, with its attendant high heat evolution and the creation of impurities. Thompson, in his above referenced Patent, and in his subsequent U.S. Patents: U.S. Pat. Nos. 3,725,156; 3,736,104; 3,749,678; 3,806,323 and 3,861,880 has provided the art with examples of fuel-less, water-initiable, low-heat evolution, catalytic decomposition chemical oxygen generators that lend themselves far more favorably to personal, safe portability. U.S. Pat. No. 3,733,008 (Churchill, Thompson & McBride) introduced lightweight compact and convenient carrying cases, or dispensers, containing a plurality of oxygen generators with a carrying strap and detached mask or cannula. This Patent included in its claims, "replaceably receiving at least one oxygen generating canister," which would work without losing oxygen because of the ball-seated check valves included in each of the three orifice ports. However, their applications did not address a "single generator" carrying case or dispenser.

In U.S. Pat. No. 3,736,104 (Churchill & Thompson), while introducing to the art various embodiments of thin-walled tin plated steel cans, electrically and chemically initiated generators, differences in starting cone compounds, and a number of physical generator characteristics, did illustrate in FIG. 9, & FIG. 10, methods of activating a single generator with outlet delivery tubes identified. These were not, however, carried to practicable completion as single generator 'personal' dispensers because the temperature of the oxygen at the outlet tube is between 400° F. and 460° F., far too hot for direct human inhalation. (See U.S. Pat. Nos. 2,121,347 & 3,725,156). In a similar addition to related art, U.S. Pat. No. 3,986,838 (Reicherr) the subject matter focused primarily on the fracturability and mounting options of glass vial, capsule or ampoule ignition techniques. This Patent referred to the same FIG. 10 cited above in U.S. Pat. No. 3,736,104 (Thompson) as a method to activate a single generator in its own dispenser; the disclosure was, however, not carried to practicable completion either, and also delivered oxygen far too hot for direct human inhalation.

Prior to the above improvements, the related art included the disclosures of U.S. Pat. Nos. 2,121,347 (Hausmann) and 2,558,756 (Jackson) which described single cell generators, however, as cumbersome and not appropriate for carrying as a personal accessory. In addition, the prior art included U.S. Pat. Nos. 2,507,450 (Millikan et al), 3,276,846 (Montet al) and 3,580,250 (Oroza) which disclosed the requirements for elaborate starting mechanisms and expensive heavy insulated containers in order to handle the hazardous high temperature combustion. These were considered too expensive to market as off-the-shelf items and did not provide medically pure oxygen.

A more recent addition to the related art is included in U.S. Pat. No. 3,955,931 (Thompson) which introduces a single generator with a snap-on cap acting as a dispenser, and an enclosed mask which, however, employs a relatively complex packaging and insulation technique. This consists of a generator jacket, or shroud, of hydrate salts sandwiched between layers of metal foil-backed refractory fibers, and which may require a moisture proof shelf-life storage envelope. A concern inherent to the hydrate salt refractory fiber jacket, which makes possible the ability to "handle" the generator itself with bare hands, during or immediately following the reaction cycle, appears to be the negative effect of reducing the personal portability of the unit. Another concern within the technology of this patent occurs when the snap-on cap is removed to facilitate replacement activity, thus exposing the bare area of the top of the used generator to the operator or patient, which has a stated temperature of 627° F. according to Example III of this patent. A further concern noted in Example III of this patent is the apparent temperature of the oxygen at the exit orifice of the generator, which is near or at the stated 627° F. of the generator (canister) surface temperature, and the consequent improbability that a delivery robing of normal length will cool this oxygen to near body temperature prior to reaching the mask for inhalation.

A mote serious concern, however, emerges when considering the consequences of a rupture in the moisture proof envelope during the shelf-life storage permitting the hydrate salts to effloresce, or any hydrate salt to decompose in any manner with or without a protective envelope. At that point the means of converting the sensible heat of the exothermic reaction cycle to the heat of evaporation has been eliminated, and in fact, replaced with external insulation on the generator, which according to Example II in this patent, appears to drive the generator wall temperature toward 3000° F.

While the above cited references introduce and disclose a number of noteworthy advances and technological improvements within the art, none completely fulfills the specific objectives achieved by this invention.

SUMMARY OF THE INVENTION

The primary object of this invention is to provide a lightweight, portable and safe dispenser for single medically pure oxygen producing generators capable of being instantly activated from a completely inert condition to deliver oxygen at a rate and temperature suitable for direct human inhalation. A preferred embodiment of this invention utilizes the disposable tin can type chlorate-oxide generators disclosed in U.S. Pat. Nos. 3,702,305 (Thompson) and 3,861,880 (Thompson) cited in related art, which provide a minimum of 90 standard liters of USP oxygen with the desired mount of water vapor at a rate of 6 liters per minute for 15 minutes.

DESCRIPTION OF THE PREFERRED EMBODIMENT

Figure 1:
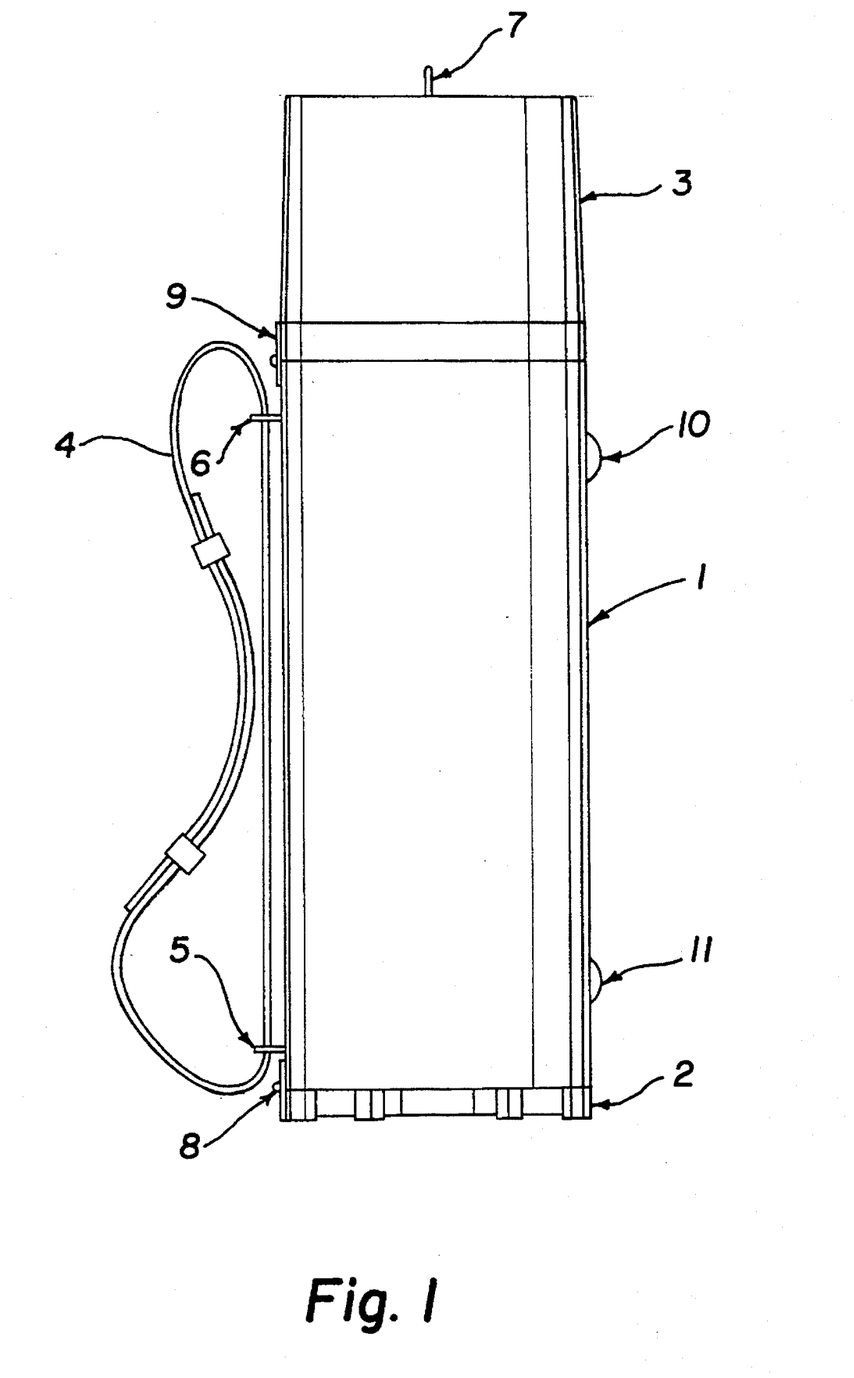
FIG. 1 is a front elevational view of a generator dispenser according to the present invention.

Referring now to the drawing, and in particular to FIG. 1, a preferred embodiment of the dispenser in this invention includes a cylindrical body 1, to which is removably fixed 8 a bottom web 2, and to which is also removably fixed 9 a mask storage cap 3. A flat carrying strap 4 can be used for carrying as illustrated, when threaded through strap-hasps 5 and 6, or can be carried in a more upright manner when additionally threaded through strap-hasp 7 located on the cap. The cap is lock-equipped 33 with button release 10, and the bottom web is likewise lock-equipped 34 with button release 11. The cylindrical body is a light weight material such as extrudable aluminum or injection molded plastic, with a fluted or ridged exterior configuration to minimize Heat conductivity to the fingers of someone holding the dispenser while it is operating. The exterior finish of the cylindrical body is of a fiber-content heat resistant paint, also designed to minimize heat conductivity.

Figure 2:
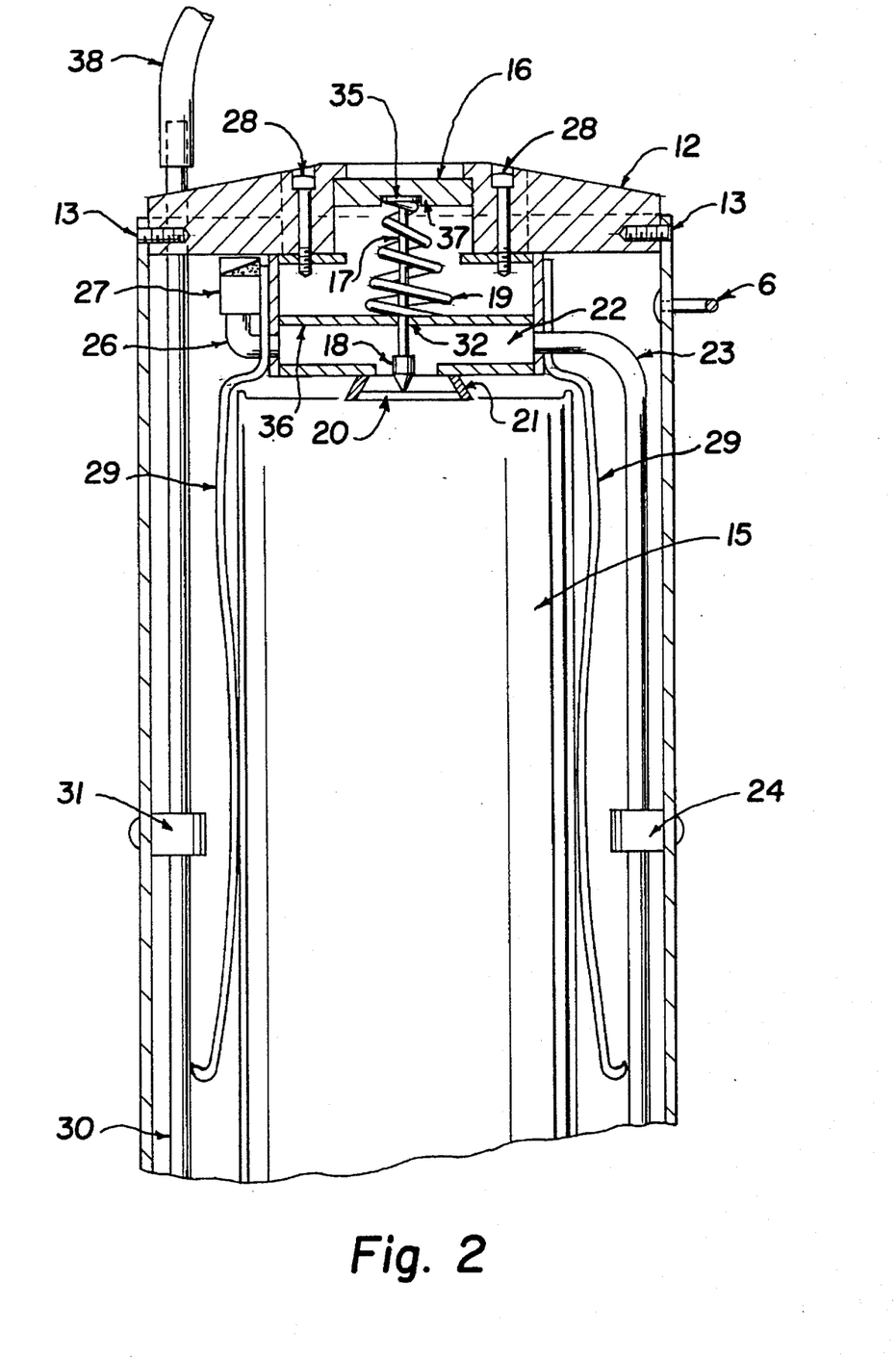
FIG. 2 is a sectional view of the upper portion thereof with a generator in place.
Figure 3:
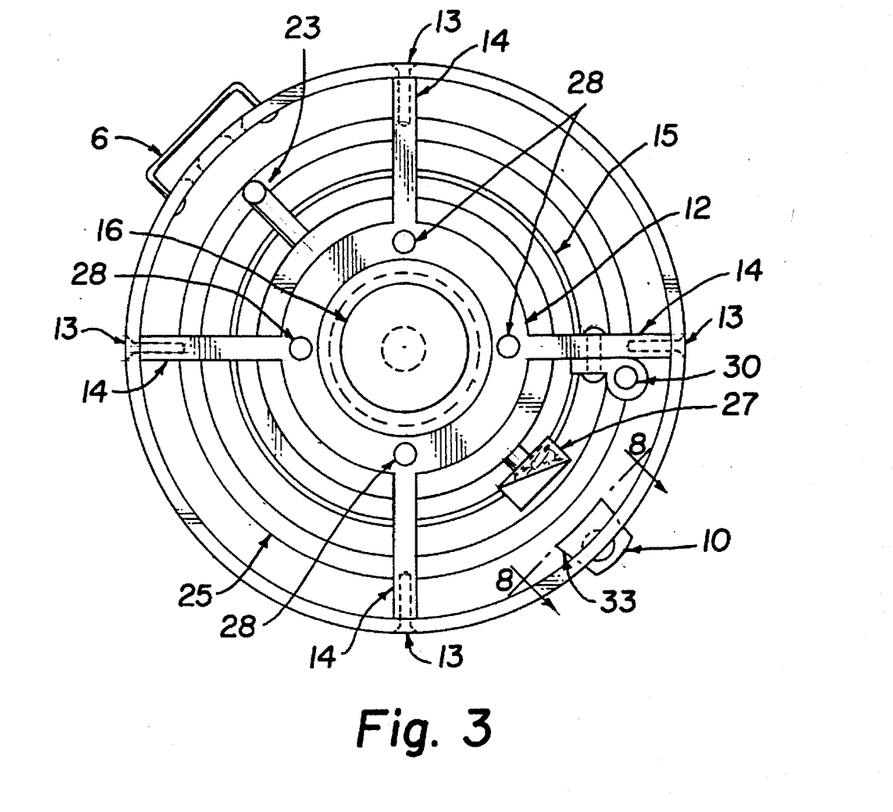
FIG. 3 is a top plan view thereof with the cap removed.
Figure 4:
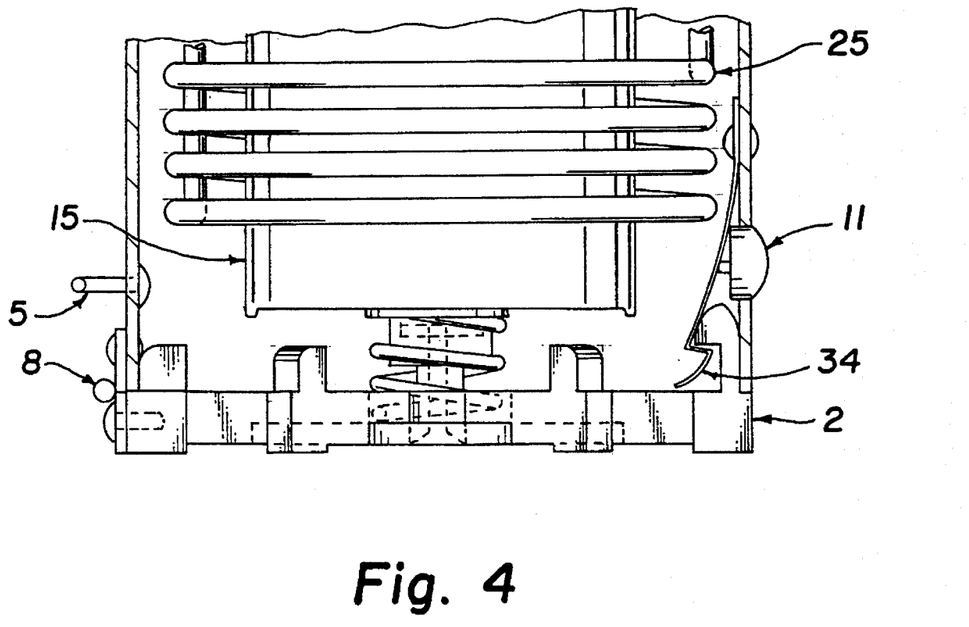
FIG. 4 is a sectional view of the lower part thereof with the bottom web locking a generator in place.

FIG. 2, FIG. 3 and FIG. 4 may be referred to together as covered by the following text. FIG. 2 shows a cutaway of the upper portion of the dispenser which includes a sectional view of the top web 12, made up of a plurality of equally spaced fingers 14 attached to the top of the cylindrical body by fasteners 13, generating radially from the center of the top web which holds the starting mechanism for the oxygen generator 15 depicted in-place ready for use. The oxygen generator itself 15 is not shown with internal detail, and is instead incorporated by reference in the related art section, as that covered within the disclosures of U.S. Pat. Nos. 3,702,305 (Thompson); 3,725,156 (Thompson); 3,736,104 (Thompson); 3,749,678 (Thompson); 3,806,232 (Thompson) and 3,861,880 (Thompson). Briefly, these disclosures describe a generator cell containing a compressed chlorate-oxide briquet which has the shape and size of an elongated block of hexagonal cross section with a tapered leading end and a tapered rectangular bottom end. The leading end has a recess for receiving ignition material which is water activated and preferably, has the formulation disclosed in U.S. Pat. No. 3,725,156 (Thompson), the disclosure of which is incorporated herein by reference. One end of the tin can has a sealed orifice which is easily punctured to expose a plunger slidable in a sealed water-filled chamber which is punctured by a pin depending from the plunger when the plunger is depressed, or a vial which is fractured by the pin when the plunger is depressed. The liberated water immediately, moistens the ignition cone material which activates the chlorate briquet. The generator cell contains a metal baffle with a top or end wall fitting snugly in the can in spaced relation from the orificed end of the can and providing a compartment in the top of the can. Two legs from the baffle grip diametrically opposed side walls of the briquet and provide an oxygen flow path between the side wall of the can and the legs to the compartment in the can above the battle. This compartment is filled with filter material effected to absorb any odors in oxygen en route to the orifice. Additional mats are positioned between the top end of the briquet and the end wall of the baffle, and a bottom mat is provided between the bottom end of the briquet and the bottom of the can so that the briquet in effect is clamped between shock absorbing mats and embraced by the baffle to be centered in the can with ample oxygen flow paths between the briquet and the can. No insulation surrounds the briquet and heat radiation is uninhibited. The mats between the briquet and the end wall of the baffle have central apertures overlying the ignition cone of the briquet and these apertures are filled with a loose powder first fire material which may be of the same formulation as the ignition cone. The reduced leading edge of the briquet surrounding the ignition cone is desired to prevent a sudden outpouring of oxygen at the start of the reaction since this portion of the briquet surrounds the ignition cone and is rapidly heated. As the reaction proceeds, the temperature tends to rise and accelerate the reaction but the reduced size of the trailing end of the briquet provides less cross sectional reaction area thereby reducing the available oxygen source even though the reaction rate may increase, and thus maintains a constant delivery rate of oxygen.

Figures 5A, 5B:
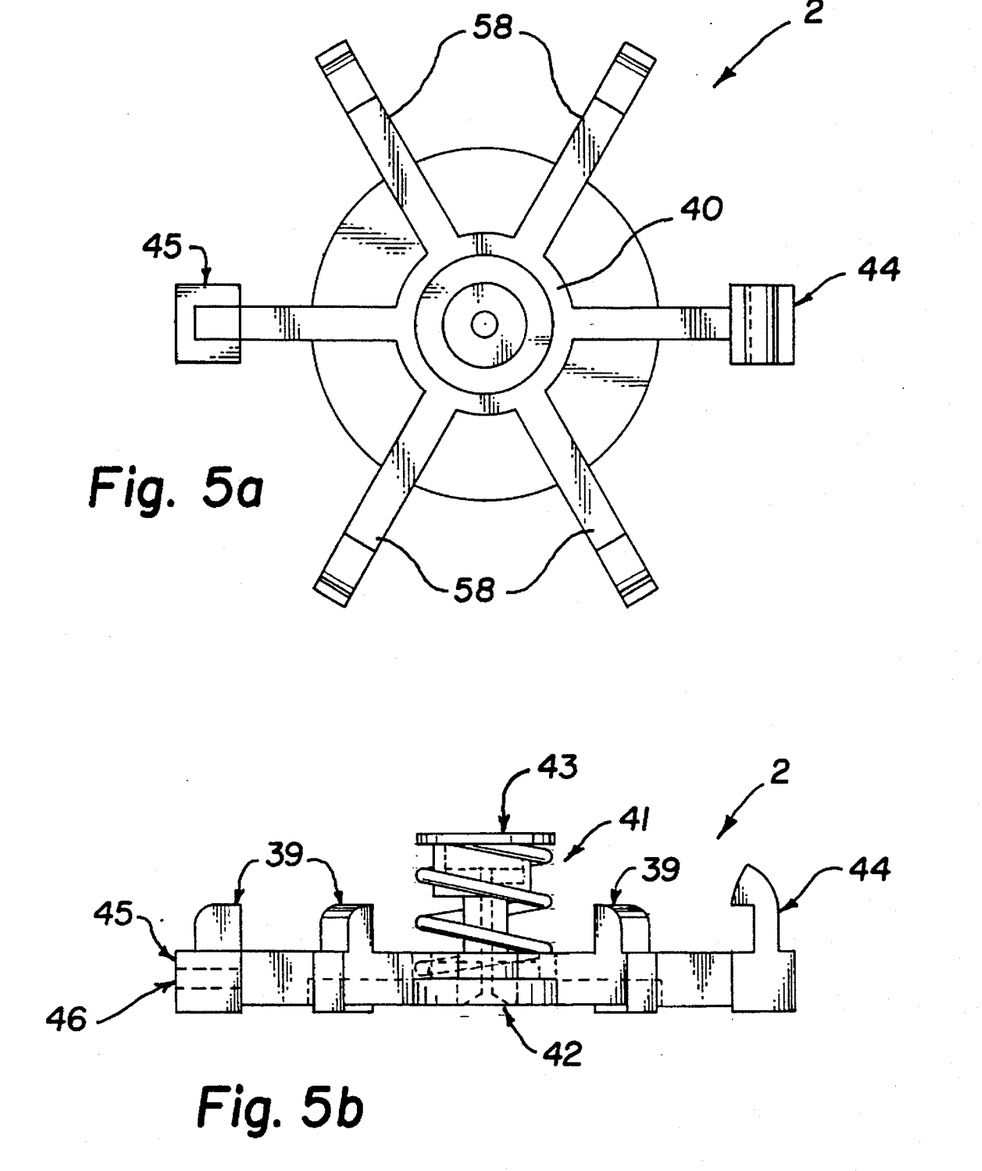
FIG. 5a is a top plan view of the bottom web.
FIG. 5b is a front elevational view thereof.

The mechanism for activating the oxygen flow generator requires a pointed ram 18 to first perforate the seal located in the center of the top wall of the generator and thence a forceful depressing of this ram to cause the release of the reaction initiation liquid from either the discipline of piston-cup storage, or fracturable vial storage. The top web contains within its center a vertically movable button 16 which in a counter born on its underside 35 holds the top 37 of the shaft 17 to the ram 18 concentrically centered and poised by a spring load 19 to keep the ram just above the top of the generator seal and in the center of the dispenser receiving port 20 which supports a heat resistant flexible seal 21 to contain and direct all oxygen flow from the generator into the plenum 22 or initial expansion chamber, and thence into the inlet tube 23 which leads down the inside wall of the dispenser to which it is fastened by an insulated grommet 24 and thence to a cooling coil 25 located at the bottom of the dispenser which utilizes the 'chimney effect' of airflow to provide cooling. The plenum or initial expansion chamber also ports the oxygen by tube 26 to a pressure operated flow indicator 27 visible from the top of the dispenser. The top 36 of the plenum 22 shares an alignment aperture 32 for the ram shaft, and the entire mechanism is affixed to the bottom of the top web by an appropriate quantity of concentrically arranged countersunk fasteners 28. A number of concentrically, equidistant spring-like fingers 29 are affixed to the outside of the plenum and depend downward as a cage to align the oxygen generator spatially in the center of the dispenser. The outlet tube 30 from the cooling coil, now carrying oxygen at ambient temperature, leads upward along the inside of the dispenser to which it is fastened 31, and exits into a flexible delivery tubing 38 for attachment to a breathing mask, FIG. 7. The bottom web 2, FIG. 5, is a light weight rigid material with alignment lugs 39 rising from each of the concentric legs 58 which provide dependable axial alignment for the cylindrical body, and a sturdy base for the complete dispenser. The center hub 40 of the bottom web houses a compressible spring assembly 41 which clamps the oxygen generator 15 securely against the heat resistant flexible seal 21 of the dispenser receiving port 20 when the bottom web is closed and latched. This assembly is held in the bottom web by a through-fastener 42 of which the top part of the thimble 43 is the retainer which is allowed to slide vertically to accommodate the presence or absence of an oxygen generator in the dispenser. One of the lugs 44 is so shaped as to provide the latch for the lock 34 when the bottom is closed, and the opposite end of this specific axial arm 45 is shaped to receive the fasteners 46 affixing it to the body.

Figure 6A:
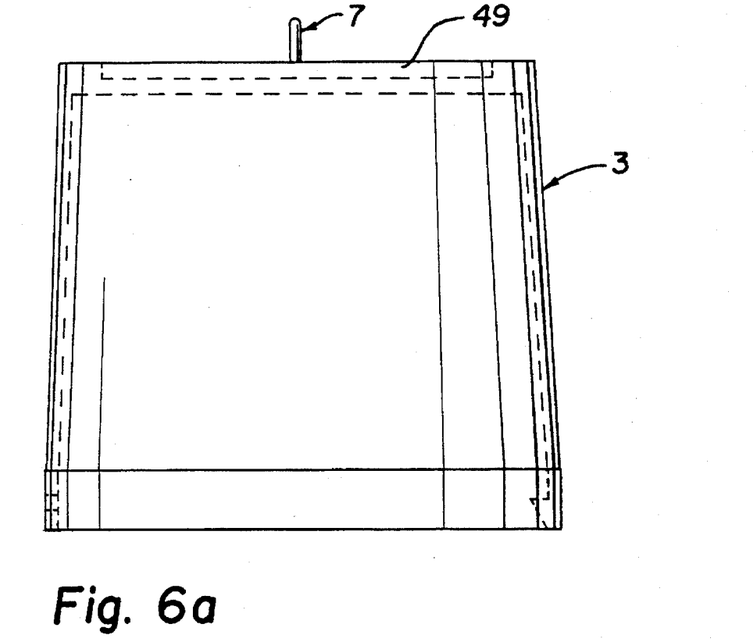
FIG. 6a is a front elevational view the cap of the dispenser of FIG. 1.
Figure 6B:
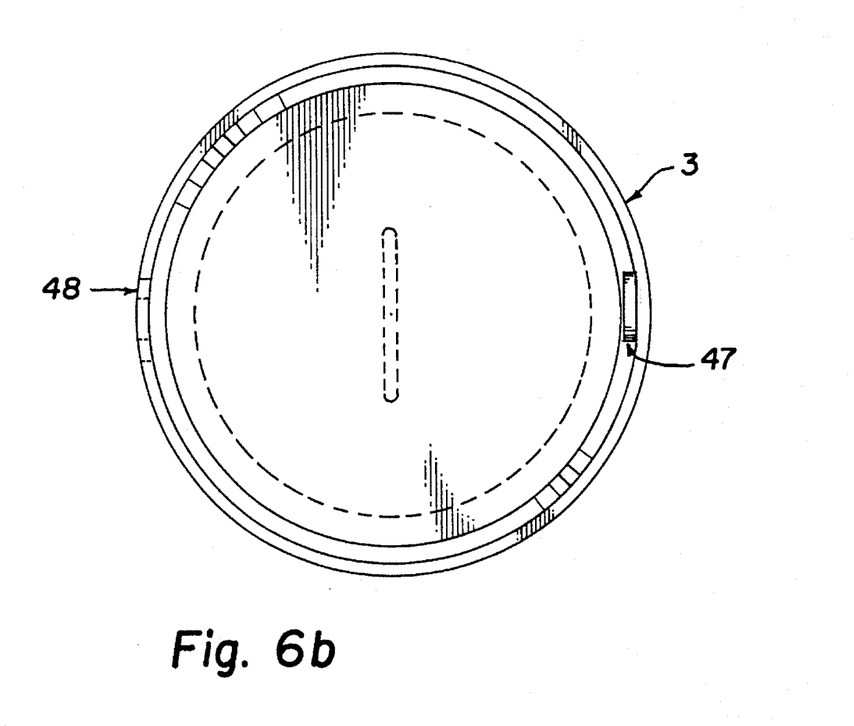
FIG. 6b is a bottom plan view thereof.
Figure 7A:
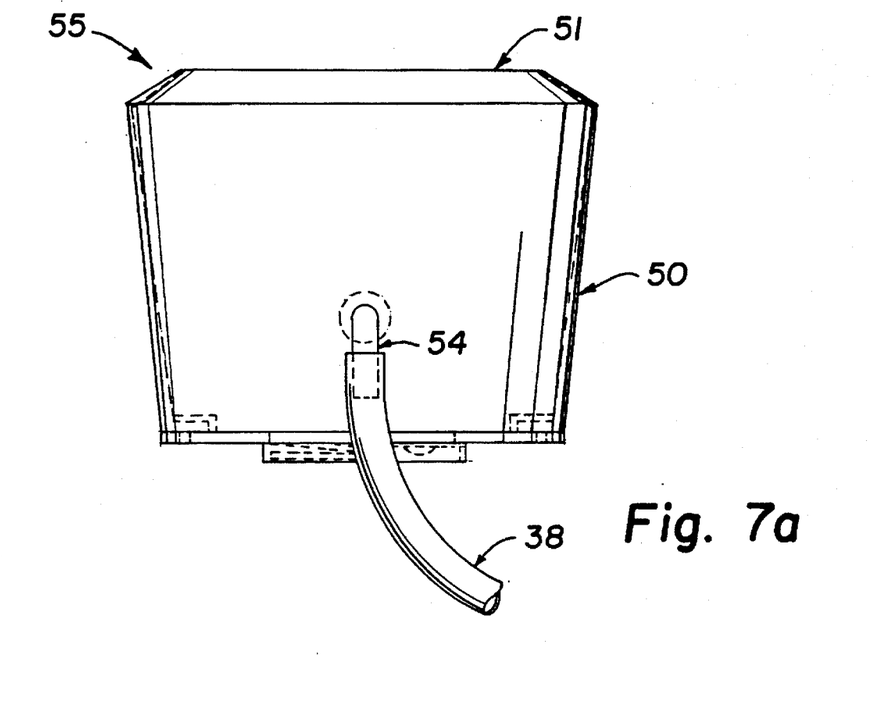
FIG. 7a is a front elevational view of a mask for the dispenser of FIG. 1.
Figure 7B:
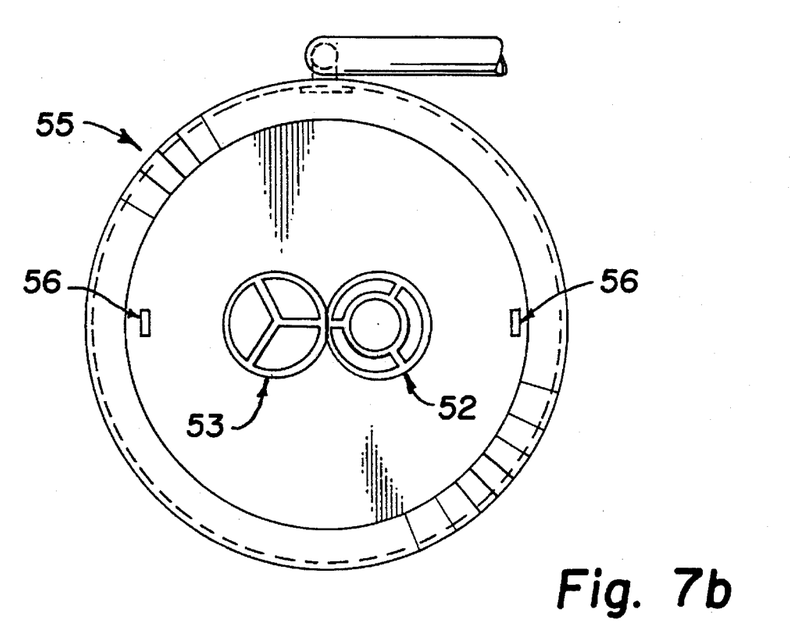
FIG. 7b is a bottom plan view thereof.
Figure 8:
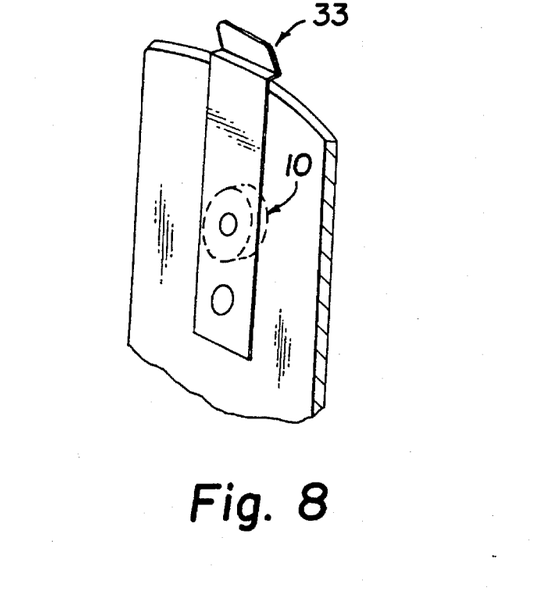
FIG. 8 is a top front right perspective view of the section taken along 8—8 of FIG. 3.

The dispenser cap 3, FIG. 6, is of molded plastics with the same style of fluted or ridged exterior as the body of the dispenser and is finished in the same type of fiber-content paint. The top wall of the cap bears a carrying strap-hasp 7 affixed through it, and the outside of the cap top is preferred for a product label 49. The cap is equipped within a latch ramp 47 for the lock 33, and is drilled for fasteners 48 for attachment to the cylindrical body. The cap is of sufficient size to enable storage of the breathing mask, its elastic head band and the required length of flexible delivery tubing. When the mask is being used, the cap cannot be closed and therefore the continuous 'chimney effect' of the cooling airflow within the dispenser body is assured. The breathing mask, FIG. 7, is comprised of a flexible cone 50 with an additional flexible apron 51 to ensure more complete facial conformity. The base of the mask contains a self sealing flexible diaphragm exhalation valve 52, and a spring loaded flexible diaphragm surge valve 53 to compensate for irregular or excessive breathing requirements. The flexible delivery tubing 38 leading from the dispenser is attached to the mask cone 50 by fitting over a nipple 54 which is capable of swiveling through 360 degrees in order to accommodate any unusual delivery posture requirements. The valve plate of the mask 55 provides diametrically opposed apertures 56 for introduction of the elastic headbands, which have not been included in the drawings. Although the preferred embodiment has been derailed in the above description, several variations are herewith addressed.

The cap of the dispenser in which the breathing mask is stored can be equally effective when twist-fitted onto the top of the cylindrical body, of the dispenser by providing threads formed into the ends of the equally spaced fingers 14 above the top of the cylindrical body, which then engage matching threads formed into the equally spaced circumferentially located bosses inside of the cap. This will provide a twist attachment, or release, for the top of less than a full turn, and can be equipped within an anti-remove lock with push button control.

The flexible delivery tubing 38 can contain anywhere within its length an in-line ball/float on/off flow indicator for visual determination of positive flow by an operator/patient of the unit when in operation.

These and other objects, advantages and features of this invention will be apparent from the following description taken with reference to the accompanying drawing, wherein is shown a preferred embodiment of the invention.

From the foregoing it will be seen that this invention is well adapted to attain all of the ends and objectives hereinabove set forth, together with other advantages which are inherent to the apparatus. It will be understood that certain features and sub combinations are of utility and may be employed without reference to other features and sub combinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

What is claimed is:

1. A lightweight portable dispenser for the delivery of USP oxygen, the dispenser comprising:

a cylindrical dispenser body housing an oxygen producing generator and forming an annular space between the cylindrical dispensing body and the oxygen producing generator;

a mechanism for activating the oxygen producing generator, said mechanism including an activation button which when depressed first causes a perforation of a protective seal closing an orifice in the oxygen producing generator and thence causes the rupture of either a piston/cup or fracturable vial/ampoule container of starting liquid causing the initiation of the oxygen producing reaction;

an initial expansion chamber within the cylindrical dispenser body;

an inlet tube in open communication with the expansion chamber;

a cooling coil being in open communication at one end with the inlet tube;

an outlet tube in open communication with the end of the cooling coil opposite the inlet tube; and a bottom web attached to the periphery of the bottom of the cylindrical dispenser body, wherein the web allows air from outside of the dispenser to enter the annular space formed between the cylindrical dispensing body and the oxygen producing generator and flow out the top of the cylindrical dispenser body, wherein the air flowing through the annular space cools the cooling coil and any oxygen flowing therethrough.

2. A dispenser according to claim 1 wherein the cooling coil is formed within the annular space between the cylindrical dispensing body and the oxygen producing generator.

3. A dispenser according to claim 2 wherein the cooling coil forms a cylindrical helix.

4. A dispenser according to claim 1 further comprising a spring assembly located in the center of the bottom web for forcing the oxygen generator against the activating mechanism.

5. A dispenser according to claim 1 further including a cap removably attached to the top of the cylindrical dispenser body, within which both a flexible delivery tubing and a breathing mask or cannula are stored when not in use, wherein the flexible delivery tube is in open communication with the outlet tube on one end and the breathing mask or cannula on the other end.

* * * * *